March 19, 1940.  T. A. PETERMAN  2,194,322
VEHICLE
Filed April 15, 1937   3 Sheets-Sheet 1
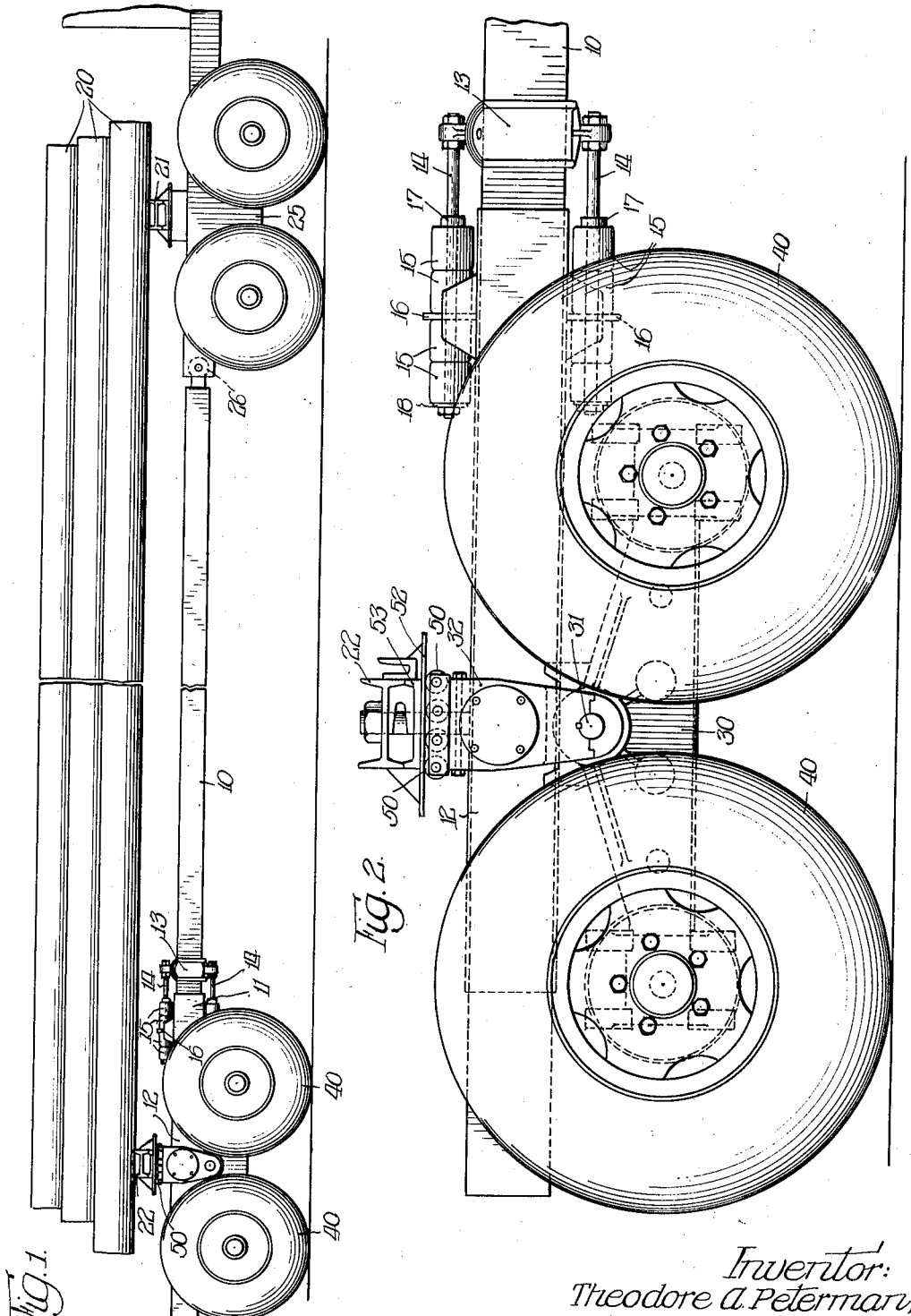
Inventor:
Theodore A. Peterman,
By (signature)
Atty.

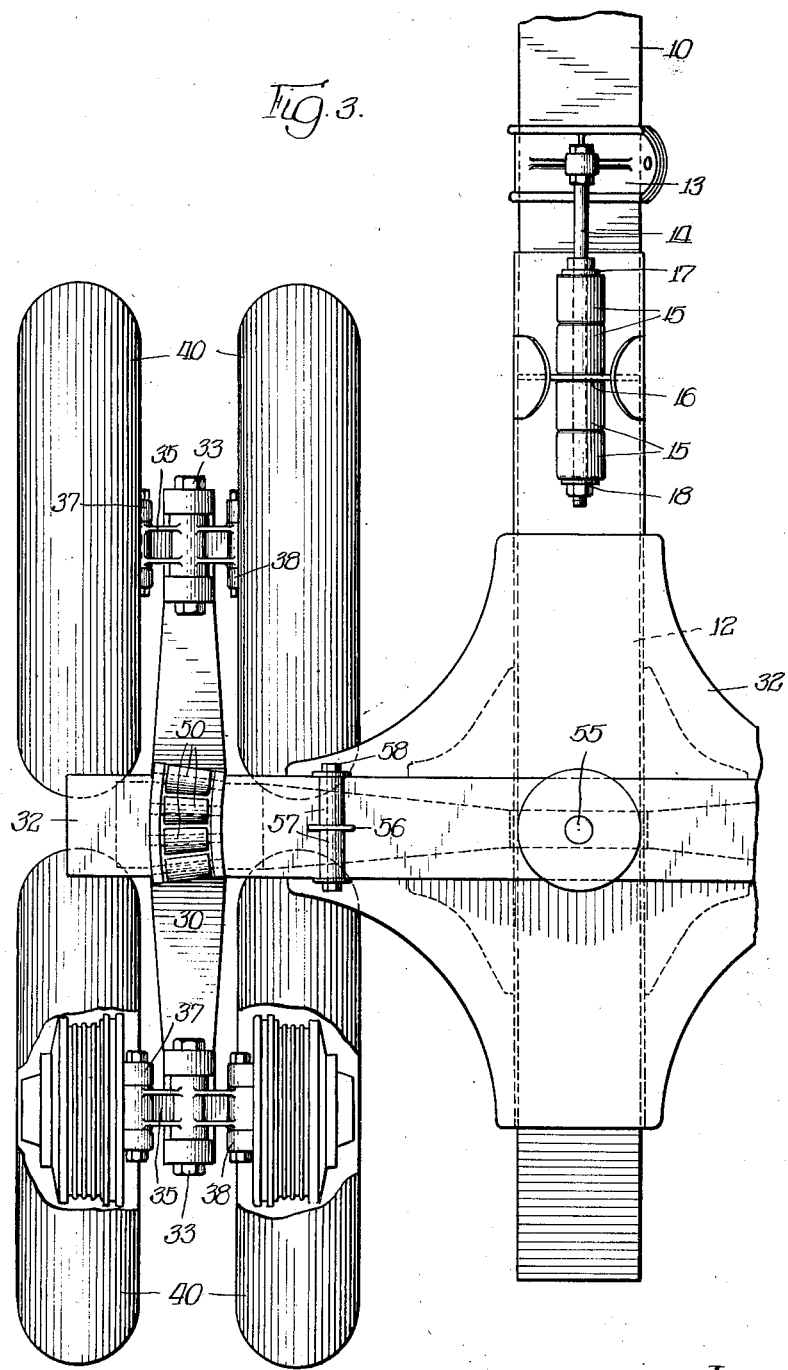

March 19, 1940.  T. A. PETERMAN  2,194,322
VEHICLE
Filed April 15, 1937  3 Sheets-Sheet 3
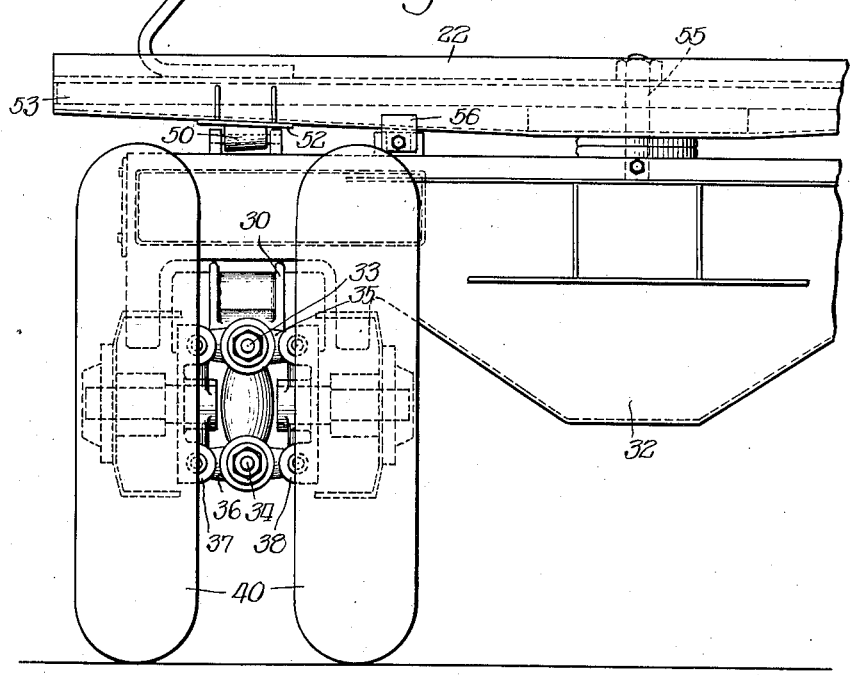
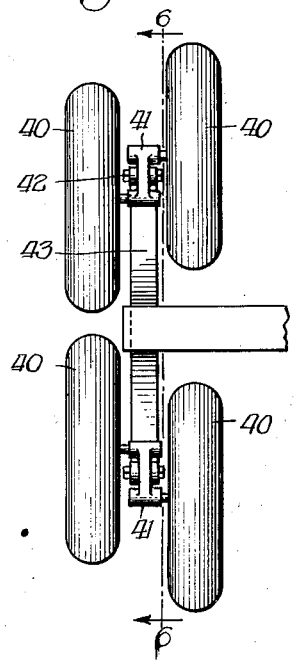
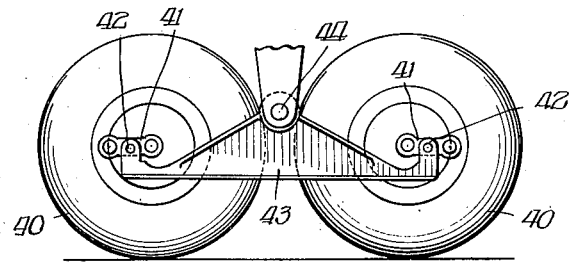
Inventor:
Theodore A. Peterman,
By Theodore H. Lassagne
Atty.

Patented Mar. 19, 1940

2,194,322

UNITED STATES PATENT OFFICE 2,194,322

VEHICLE

Theodore A. Peterman, Tacoma, Wash.

Application April 15, 1937, Serial No. 137,107

13 Claims. (Cl. 280—81)

The present invention relates to vehicle constructions and more particularly to wheel suspensions and draft riggings of especial utility in vehicles which are drawn over uneven or hilly terrain, and in which it is desirable to minimize vertical movements of the vehicle bodies and road shock transmitted from the wheels.

In the transportation of logs a trailer is ordinarily connected to a special truck body by a relatively long draft tongue, and the trailer and truck bodies are provided with members, commonly known as bunks, to engage the logs, usually by actually cutting into the lowermost logs to some extent, so that they constitute in effect a supplementary draft connection between the truck and trailer.

When the unit is loaded, therefore, there are in effect two draft connections between the truck and trailer units, and hence when the truck begins to ascend or descend a hill, or even when it passes over more slight inequalities in the terrain, there is a tendency to elongate one of these draft connections and compress the other. In such vehicles as they have heretofore been constructed, this action has caused the logs to be abraded by the truck and trailer members engaging them, so that the load will no longer be firmly seated upon the vehicle units. Furthermore the relative movement between the logs and their supports has tended to disturb the entire load and has rendered it unsafe to pile logs sufficiently high to take advantage of the full capacity of the truck and trailer, lest the load be upset by such a disturbance.

It is also desirable in such vehicles to provide means for minimizing disturbance of the load by minor unevennesses in the terrain encountered by the several wheels of the vehicle, since such a provision will not only permit the vehicle to be loaded to nearer its capacity without risk of upsetting or disturbing the load, but will render any vehicle more smooth-riding.

Having in mind the foregoing and other deficiencies of vehicles of this general character it is an object of my invention to provide a wheel suspension by means of which the weight of the vehicle may be equally borne by the road wheels under all conditions of operation.

A further object of the invention is to provide a wheel suspension which will minimize lateral swaying of the load when the vehicle encounters minor irregularities in the terrain traversed by its several wheels.

The novel features characteristic of my invention are set forth with particularity in the appended claims. The invention itself, however, together with additional objects and advantages thereof, will be best understood from the following description of specific embodiments thereof, when read in connection with the accompanying drawings, in which:

Figure 1 is a view in side elevation of a log transport trailer and truck embodying my invention, a portion of the truck body being cut away to permit the important details to be shown on a larger scale;

Figure 2 is a view in side elevation of the trailer structure, on a larger scale, together with a portion of the draft tongue;

Figure 3 is a plan view of a portion of the trailer structure, illustrating the wheel suspension and draft tongue connection;

Figure 4 is a view in rear elevation of the trailer structure of Figures 1 to 3, illustrating further details of the wheel suspension;

Figure 5 is a view in plan of a modified form of wheel suspension; and

Figure 6 is a sectional view of the modified form of wheel suspension shown in Figure 5, taken on the line 6—6 of said figure.

In order to prevent relative longitudinal movement between such a vehicle and its load as declivities and slight rises, as well as hills, are encountered I have found it most practicable to permit sufficient relative movement between the truck and trailer at their draft tongue connection to render it unnecessary for the logs to slide over their bunks on either the truck or trailer. This can be done because the logs themselves constitute, as pointed out above, a supplemental draft connection between the truck and trailer when the vehicle is loaded, and it is therefore unnecessary to provide a normal draft connection of sufficient strength to pull the load. The normal draft connection is called upon only to pull the weight of the unloaded trailer and guide the same when loaded, and may therefore be made sufficiently resilient to permit the necessary relative movement.

For this purpose, I prefer to provide, as shown in Figure 1, a draft tongue 10 which is freely slidable within a guide sleeve 11 integral with the frame of the trailer 12, and which is resiliently connected thereto by means comprising a clamp 13 secured to the draft tongue 10 at a sufficient distance from the end of sleeve 11 to permit all necessary movement within the said sleeve of the draft tongue. The clamp 13 is, in turn, connected to the frame 12 of the trailer by a plurality of draft rods 14 (see also Figures 2 and 3)

secured at one end to the clamp 13 and passing through resilient members 15 of rubber or similar material and through an aperture in the upstanding lug 16 integral with the frame of the trailer 12. An enlarged portion 17 of each of the draft rods serves to place the members 15 under compression when any compressional force is exerted upon the draft tongue 10, and discs 18 secured on the ends of the draft rods 14 serve to compress the members 15 on the opposite side of lug 16 when a pull is exerted upon the draft tongue 10. Members 15 are in each case capable of being compressed sufficiently easily and a sufficient amount to prevent any relative longitudinal movement between the logs 20, supported on the bunks comprising I beams 21 and 22 on the truck and trailer frames respectively, and the said bunks, especially inasmuch as the edges of the beams 21 and 22 in contact with the logs tend to cut into the latter and resist such movement.

In order to minimize lateral swaying as well as vertical movement of the load as the wheels of the trailer encounter uneven terrain it is desirable to provide a wheel suspension which will permit any of the supporting wheels to rise in passing over a bump, stone or the like, or to lower in passing over a depression, without correspondingly raising or lowering the overlying portion of the frame 12 and its load. This is particularly important in connection with a trailer structure of the present character because the front end of the draft tongue 10 is connected to the frame of the truck 25 by pivotal means permitting pivotal movement in any direction, such as the ball and socket joint 26. Therefore the raising of one side of the trailer would not have any tendency to raise the same side of the truck as would be the case were they rigidly connected but, instead, the truck end support of the logs would remain undisturbed and the load would be tipped at the rear end only. Such a twisting effect would tend to cause the upper logs of the load to roll off more easily than would a uniform tipping of the entire load the present invention provides, not only for such individual movement of the several wheels, but for minimization of the tipping of the vehicle incidental to such wheel movement, by providing a wheel suspension and equalizer lever support therefor adapted to reduce the amount of vertical wheel movement transmitted to the vehicle body.

In order to serve satisfactorily in a vehicle of this type, such a wheel suspension must be simple and rugged in construction. I therefore preferably provide an equalizer, preferably in the form of a beam 30 at each side of the trailer frame, pivotally mounted thereon at 31 in the main cross member 32. Pivoted on said beam 30 at each end thereof, at 33 and 34 (Figure 4) are upper and lower suspension links 35 and 36 the free ends of which are pivotally connected by wheel hub supporting members 37 and 38 respectively. It will be apparent that with this arrangement a given vertical movement of one of the wheels 40 carried by said wheel hub supporting members, will result in only half as much vertical movement of the end of the beam 30 to the end of which the supporting links 35 and 36 are pivoted, and that only one quarter of the vertical movement of the wheel will be transmitted to the pivot 31 of the beam 30 and thence to the load.

In the modified form of wheel suspension shown in Figures 5 and 6, somewhat diagrammatically, the same reduction of vertical movement transmitted to the load is secured with a smaller number of parts by mounting the front and rear pairs of wheels 40 each on a single link 41 pivotally mounted at 42 on a beam 43 pivotally mounted on the trailer frame at 44.

Referring further to Figures 3 and 4 it will be seen that an adidtional feature of the present construction is found in the provision of side bearings 50 for the bunk, one of which is disposed at the illustrated location at each side of the trailer. These bearings are mounted on the frame member 32 directly over the wheel mounting and, as shown in Figure 2, receive the entire weight of the load disposed upon the I beam 22 of the rear bunk upon which is mounted the plate member 52 overlying said bearing. As shown in Figures 3 and 4 the I beam 22, the plate member 52, and the I beam support 53 constituting the bunk are retained in position by a pivotal guide pin 55 secured in the main frame member 32, and are resiliently retained in proper position with respect to the bearing 50 by lugs 56 depending from the support 53 and retained between rubber aligning members 57 by a pin 58 secured tot he frame member 32 and passing through a lug 59, on frame member 32, and aligning members 57. By this resilient structure torque strains during turning movements are minimized and the structure is automatically realigned at their completion.

Although a specific embodiment and single modification of my invention has been described herein, it will be apparent to those skilled in the art to which the invention appertains, that many modifications thereof are possible, and it is understood that the invention is not to be considered as restricted to the forms shown except insofar as is necessitated by the prior art and by the spirit of the appended claims.

I claim:

1. A vehicle wheel suspension comprising an equalizer, a plurality of pairs of wheel supports, ground engaging wheels rotatably mounted on said wheel supports, and a plurality of pairs of suspension links pivotally mounted on said equalizer and pivotally connected to said wheel supports.

2. A vehicle wheel suspension comprising an equalizer, a plurality of pairs of wheel supports, ground engaging wheels rotatably mounted on said wheel supports, each pair of wheels being in substantial alignment transversely of said equalizer, and a plurality of pairs of suspension links pivotally mounted on said equalizer and pivotally connected to said wheel supports.

3. A wheel suspension for vehicles comprising a frame, an equalizer mounted to pivot about an axis on said frame, a plurality of pairs of suspension links mounted to pivot about axes on said equalizer substantially normal to the pivotal axis upon which said equalizer is mounted, and a pair of ground engaging wheels supported upon each of said pairs of suspension links by pivotal connections the axes of which are parallel to the axes of the pivotal connections between said links and said equalizer.

4. A wheel suspension for vehicles comprising a frame, an equalizer mounted to pivot about an axis on said frame, a pair of suspension links mounted on said equalizer to pivot about axes substantially normal to the pivotal axis upon which said equalizer is mounted and radially spaced from said axis, a second pair of suspension links mounted on said equalized to pivot about axes substantially normal to the pivotal axis on which said equalizer is mounted and radially spaced from said axis a distance equal and opposite to said first suspension links, and a pair of ground engaging wheels pivotally mounted upon each of said pairs of suspension links.

5. A wheel suspension for vehicles comprising a frame, a longitudinally extending equalizer beam pivotally mounted thereon, having arms disposed at each side of said pivoted mounting, a pair of suspension links pivotally mounted adjacent each end of said equalizer beam in vertically spaced relation with the beam extending between the links of each pair, a pair of road wheel supports pivotally connected to the opposite ends of each of said pairs of suspension links, and road wheels rotatably mounted on said supports.

6. In a multiple wheel vehicle having a frame supported by a plurality of wheel suspensions, a balanced wheel suspension comprising a pivotal mounting on said frame having a fixed axis disposed at a right angle to the direction of movement of the vehicle, an equalizer beam pivoted at substantially its midpoint on said mounting, and substantially identical means adjacent the opposite ends of said beam and equidistantly spaced from said pivotal mounting for mounting road wheels on said beam comprising pivotal mountings on said beam adjacent the opposite ends thereof and equidistantly spaced from said first mentioned pivotal mounting, each having a fixed axis disposed at a right angle to the axis of said first mentioned pivotal mounting, suspension links pivoted on the pivotal mountings on said beam, wheel supports carried by said suspension links, and road wheels rotatably mounted on said wheel supports.

7. In a multiple wheel vehicle having a frame supported by a plurality of wheel suspensions, a wheel suspension comprising a pivotal mounting on said frame, having a fixed axis disposed at a right angle to the direction of movement of the vehicle, an equalizer beam pivoted at substantially its midpoint on said mounting, a plurality of pivotal mountings on said beam adjacent the opposite ends thereof and equidistantly spaced from said first mentioned pivotal mounting, each having a fixed axis disposed at a right angle to the axis of said first mentioned pivotal mounting, suspension links pivoted on the pivotal mountings on said beam, wheel supports carried by said suspension links, and road wheels rotatably mounted on said wheel supports.

8. In a multiple wheel vehicle having a frame supported by a plurality of wheel suspensions, a wheel suspension comprising a pivotal mounting on said frame, having a fixed axis disposed at a right angle to the direction of movement of the vehicle, an equalizer beam pivoted at substantially its midpoint on said mounting, a plurality of pivotal mountings on said beam adjacent the opposite ends thereof and equidistantly spaced from said first mentioned pivotal mounting, suspension links pivoted on the pivotal mountings on said beam, wheel supports carried by said suspension links, and road wheels rotatably mounted on said wheel supports.

9. In a multiple wheel vehicle having a frame supported by a plurality of wheel suspensions, a wheel suspension comprising a pivotal mounting on said frame, having a fixed axis disposed at a right angle to the direction of movement of the vehicle, an equalizer beam pivoted at substantially its midpoint on said mounting, a plurality of pivotal mountings on said beam adjacent the opposite ends thereof, each having a fixed axis disposed at a right angle to the axis of said first mentioned pivotal mounting, suspension links pivoted on the pivotal mountings on said beam, wheel supports carried by said suspension links, and road wheels rotatably mounted on said wheel supports.

10. In a multiple wheel vehicle having a frame supported by a plurality of wheel suspensions, a wheel suspension comprising a pivotal mounting on said frame, having a fixed axis disposed at a right angle to the direction of movement of the vehicle, an equalizer beam pivoted at substantially its midpoint on said mounting, a plurality of pivotal mountings on said beam adjacent the opposite ends thereof, suspension links pivoted on the pivotal mountings on said beam, wheel supports carried by said suspension links, and road wheels rotatably mounted on said wheel supports.

11. In a multiple wheel vehicle having a frame supported by a plurality of wheel suspensions, a wheel suspension comprising a pivotal mounting on said frame, having a fixed axis disposed at a right angle to the direction of movement of the vehicle, an equalizer beam pivoted on said mounting, a plurality of pivotal mountings on said beam each having a fixed axis disposed at a right angle to the axis of said first mentioned pivotal mounting, suspension links pivoted on the pivotal mountings on said beam, wheel supports carried by said suspension links, and road wheels rotatably mounted on said wheel supports.

12. In a multiple wheel vehicle having a frame supported by a plurality of wheel suspensions, a wheel suspension comprising a pivotal mounting on said frame, having a fixed axis disposed at a right angle to the direction of movement of the vehicle, an equalizer beam pivoted on said mounting, a plurality of pivotal mountings on said beam, suspension links pivoted on the pivotal mountings on said beam, wheel supports carried by said suspension links, and road wheels rotatably mounted on said wheel supports.

13. A vehicle suspension comprising a frame, an equalizer beam centrally pivoted on said frame, a first equalizer link centrally pivoted adjacent one extremity of said beam, a wheel spindle on one side of said beam connected to one end of said first link, a second wheel spindle on the other side of said beam connected to the other end of said first link, a second equalizer link centrally pivoted adjacent the other extremity of said beam, a third wheel spindle on said one side of said beam connected to one end of said second link, and a fourth wheel spindle on said other side of said beam connected to the other end of said second link.

THEODORE A. PETERMAN.